United States Patent Office
3,321,434
Patented May 23, 1967

3,321,434
SATURATION OF POROUS MATERIAL WITH SOLUTION OF PHENOLIC COMPOUND AND HEXAMETHYLENETETRAMINE IN SOLVENT CONTAINING ACETIC ACID, PROPIONIC ACID OR MIXTURES THEREOF
Thomas J. Billings, Jr., St. Paul, Minn., and Albert L. Micchelli, Newark, N.J., assignors to Minnesota Mining and Manufacturing Company, St. Paul, Minn., a corporation of Delaware
No Drawing. Continuation of application Ser. No. 176,437, Feb. 28, 1962. This application June 16, 1966, Ser. No. 558,148
7 Claims. (Cl. 260—31.2)

This application is a continuation of United States Ser. No. 176,437, filed on Feb. 28, 1962, now abandoned.

This invention relates to the preparation of organic solutions of water-insoluble phenolic compounds and hexamethylenetetramine. These compositions are especially useful as saturating resins and adhesives. As saturating solutions, they are especially useful in the preparation of brake bands and clutch facings from impregnated millboard, and in the treatment of wood or paper. As adhesives they are especially useful in the preparation of plywood.

Phenolic compounds exist in different stages, varying from the simple phenol to thermoset phenolic resins. Phenolic compounds react with formaldehyde to form a variety of products. One common source of formaldehyde for this reaction is hexamethylenetetramine. Mixtures of phenol and formaldehyde or formaldehyde precursors, such as hexamethylenetetramine, may be reacted in proportions so as to prepare directly a thermoset phenolic resin. One aspect of this invention is concerned with this manner of preparing a phenolic resin. The phenolic compound may be reacted with less formaldehyde than is required to produce thermoset phenolic resins and this type of phenolic compound is called a "novolak resin." The "novolak resins" are then reacted subsequently with additional formaldehyde in the form of hexamethylenetetramine to produce thermoset phenolic resins. A second aspect of this invention is concerned with the preparation of thermoset phenolic resins from novolak resins and for purposes of this invention water-insoluble novolak resins are to be considered phenolic compounds. Novolaks and hexamethylenetetramine composition are customarily used as finely divided heterogeneous solid mixtures and such mixtures are not suitable as saturants. Hexamethylenetetramine is not soluble in liquid novolak resins. This invention teaches a method whereby the novolak and hexamethylenetetramine may be prepared as a homogeneous liquid mixture which may be used as saturants in the in situ formation of thermoset phenolic resins.

Another common intermediate in the preparation of phenolic resins is the so-called "B-stage" phenolic resin. The "B-stage" phenolic resin is prepared by reacting the phenol in the presence of bases, such as ammonia or sodium hydroxide, with formaldehyde in ratios capable of producing a thermoset phenolic resin. Generally speaking the B-stage resins which contain many methylol groups are relatively unstable and are easily converted to thermoset phenolic resins. For the purpose of this invention, B-stage phenolic resins are not considered phenolic compounds.

Accordingly, in this invention there is prepared a non-aqueous organic solution of a water-insoluble phenolic compound, at least 24 grams of hexamethylenetetramine per mole equivalent of phenolic nucleus in said phenolic compound and a water-soluble organic solvent selected from the group consisting of alcohols, carboxylic acid, and carboxylic acid anhydrides which will dissolve at least 10% by weight of hexamethylenetetramine.

Suitable water-insoluble phenolic compounds useful in the practice of this invention include these phenolic compounds derived from cashew nut shell liquid, bis-phenol-A, resorcinol, cresol, alkyl-substituted phenols and novolak resins. In each case the phenolic compound must be reacted with formaldehyde before a thermoset phenolic compound can be prepared.

Suitable alcohols, carboxylic acids and carboxylic acids anhydrides for use in this invention include methanol, ethanol, isopropanol, acetic acid, propionic acid, acetic acid anhydride and propionic acid anhydride. Other homologues of these compounds which will dissolve 10% by weight of hexamethylenetetramine may be employed. It is desirable to employ a solvent which will dissolve at least 10% by weight of hexamethylenetetramine and sufficient phenolic compound to react with the formaldehyde liberated from this amount of hexamethylenetetramine. These solvents may be the sole solvent employed or they may be used in combination with other organic solvents, such as aromatic and aliphatic hydrocarbons, ketones, ethers and so forth. In every instance, the solvent or solvents employed must dissolve at least 10% by weight of phenolic compound.

In many applications, it may be desirable to prepare two separate stable solutions, one of the hexamethylenetetramine and the second of the phenolic compound, which are compatible and mixed just prior to their use.

EXAMPLE I

Solutions of hexamethylenetetramine (10 parts by weight) in acetic acid (20 parts by weight) and of polymerized cashew nut shell liquid, (average molecular of 600) 100 parts by weight in toluene (90 parts by weight) were mixed to prepare a solution capable of producing a thermoset phenolic resin.

Asbestos millboard was saturated by immersion for two hours in this solution. After drying and solvent removal, the millboard by its increase in weight showed a 33% saturation with resin. The saturated millboard was cured, by heating for 12 hours during which time the temperature was raised uniformly from 220° F. to 350° F., 4 hours at 350° F., one hour at 420° F. and two hours at 450° F., to produce excellent brake linings as evidenced by the Society of Automotive Engineers Brake Lining Quality Control Test Procedure (May 1958). In this test, the brake linings are first maintained in contact at a constant pressure with a drum which is revolved at a constant speed. The coefficient of friction was constantly measured at temperatures from 200 to 550° F. In the second part of the test, the coefficient of friction is measured intermittently at 500° F., 400° F., 300° F. and 200° F. as the drum cooled. The brake lining of this example had coefficients of friction of 0.41 to 0.31 in the first part of the test over the temperature range of 200–550° F. In the second part of the test, the coefficient of friction was 0.31 at 500° F.; 0.30 at 400° F.; 0.38 at 300° F. and 0.43 at 200° F. which may be characterized as good recovery.

By way of comparison, a brake lining was prepared in the same manner by saturating millboard with a toluene solution of a tung oil-modified B-stage phenolic resin presently employed on a large scale in the manufacture of brake linings. The resulting brake lining had a coefficient of friction of 0.40 at 200° F. which faded rapidly to a coefficient of friction of 0.06 at 550° F. In the second part of the test, the recovery was poor (0.08 at 500° F.; 0.06 at 400° F.; 0.10 at 300° F. and 0.02 at 200° F.).

EXAMPLE II

Cashew nut shell liquid (100 parts by weight), tall oil pitch having an acid equivalent weight of 1000 (100 parts by weight) and cresol sulfonic acid (12 parts by weight) were reacted at 300° F. until a viscosity of 30,000 centipoises was reached. The acid-modified cashew nut shell liquid (212 parts by weight) was dissolved in toluene (168 parts by weight). This solution (380 parts by weight) was then added to 31 parts by weight of a solution of hexamethylenetetramine (33 parts by weight) dissolved in acetic acid (67 parts by weight).

(A) *Preparation of Automotive Brake Linings.*—Asbestos millboard was saturated, by immersion for two hours in this solution. After drying, and solvent removal, the millboard by its increase in weight, showed a 33% saturation with resin. The saturated millboard was cured, by heating for 12 hours during which time the temperature was raised uniformly from 220° F. to 350° F., 4 hours at 350° F., one hour at 420° F. and two hours at 450° F. to produce excellent brake linings as evidenced by the Society of Automotive Engineers Brake Lining Test, as described in Example I. The brake lining of this example had coefficients of friction of 0.40 to 0.33 in the first part of the test over the temperature range of 200–550° F. In the second part of the test, the coefficient of friction was 0.29 at 500° F.; 0.31 at 400° F.; 0.39 at 300° F. and 0.40 at 200° F. which may be characterized as good recovery.

(B) *Preparation of Machinery Brake Linings.*—Segments of a 2 ply wire reinforced, ¼″ x 2″, woven asbestos tape were densified at room temperature and a pressure of 2500 p.s.i. The densified asbestos were saturated by immersion for 2½ hours in the solution of this example. After drying for 16 hours at 77° F., 4 hours at 150° F., and 4 hours at 220° F. the resin pick-up of the asbestos was found to be 30% based on the original weight of the woven asbestos segment. The dried material was clamped for an 11″ diameter brake form and cured for 12 hours at a temperature increasing gradually and uniformly from 220° F. to 350° F., 4 hours at 350° F., 1 hour at 420° F., and 2 hours at 450° F.

The cured brake lining exhibited an excellent coefficient of friction and good resistance to fade at elevated temperatures.

EXAMPLE III

Comparable reactive hexamethylenetetramine-phenolic solutions to those shown in Examples I and II were prepared by mixing a solution of hexamethylenetetramine (33 parts by weight) dissolved in acetic acid (67 parts by weight), hereafter called "Solution A," with phenolic solutions as follows:

(1) 371 parts by weight of a solution of cashew nut shell liquid (282 parts by weight) in toluene (89 parts by weight) and 85 parts by weight of Solution A.

(2) 328 parts by weight novolak resin solution (200 parts by weight resin and 128 parts by weight toluene) and 60 parts by weight of Solution A. A novolak resin was prepared by reacting 37% aqueous formaldehyde (410 parts by weight) and 95% aqueous phenol (940 parts by weight) for 30 minutes at 95° C. in the presence of sulfuric acid (5 parts by weight), followed by refluxing for 1 hour, and striping at 300° F. and 15 Hg pressure.

(3) 380 parts by weight of a solution of a bis-phenol, as described in U.S. Patent No. 2,317,607 (200 parts by weight) in toluene (180 parts by weight) and 60 parts by weight of Solution A.

(4) 371 parts by weight of a solution of Bis-phenol A (200 parts by weight) dissolved in methyl-iso-butyl ketone (105 parts by weight) and ethanol (66 parts by weight) and 90 parts by weight of Solution A.

(5) 400 parts by weight of a solution of a novolak resin (10 parts by weight resin, 80 parts by weight toluene, and 10 parts by weight methyl-isobutyl ketone) and 60 parts by weight of Solution A.

The novolak resin was prepared from o-cresol (300 parts by weight), formaldehyde (120 parts by weight) tung oil (200 parts by weight) and cashew nut shell liquid (200 parts by weight).

(6) 177 parts by weight of a toluene solution of a novolak resin (960 parts by weight resin and 177 parts by weight toluene) and 60 parts by weight of Solution A. This novolak resin was prepared from cashew nut shell liquid (900 parts by weight) and formaldehyde (60 parts by weight).

EXAMPLE IV

A saturating solution was prepared from the phenolic compound of Example II (400 parts by weight phenolic compound dissolved in toluene, 318 parts by weight) and a solution (60 parts by weight) of hexamethylenetetramine (33 parts by weight) dissolved in acetic anhydride (67 parts by weight).

EXAMPLE V

A saturating solution was prepared by dissolving the phenolic compound of Example I (100 parts by weight) and hexamethylenetetramine (10 parts by weight) in isopropanol (90 parts by weight).

What is claimed is:

1. A non-aqueous homogeneous, liquid, organic solution suitable for use as a saturant for the in situ formation of a thermoset phenolic resin in a porous material having a solute consisting of a water insoluble, formaldehyde reactable phenolic compound and at least 24 grams of hexamethylenetetramine per mole equivalent of phenolic nucleus in a water-soluble organic solvent which will dissolve at least 10 percent of said phenolic compound and which is acetic acid, propionic acid or a mixture thereof.

2. The organic solution of claim 1 in which said water-soluble organic solvent is the only solvent.

3. The organic solution of claim 1 in which said water-soluble organic solvent is in admixture with a second organic solvent which will dissolve at least 10 percent of said phenolic compound.

4. The organic solution of claim 1 in which said water insoluble, formaldehyde reactable phenolic compound is a novolak resin.

5. The organic solution of claim 1 in which said water-soluble organic solvent is acetic acid.

6. The organic solution of claim 1 in which said water-soluble organic solvent is propionic acid.

7. A process for the in situ formation of a thermoset phenolic resin in a porous material which comprises saturating the porous material with a non-aqueous, homogeneous, liquid organic solution having a solute consisting of a water-insoluble, formaldehyde reactable phenolic compound and at least 24 grams of hexamethylenetetramine per mole equivalent of phenolic nucleus in a water-soluble organic solvent which will dissolve at least 10 percent of said novolak resin and which is acetic acid, propionic acid or a mixture thereof, removing the solvent, and heating at a temperature above 50° C.

References Cited by the Examiner

UNITED STATES PATENTS

| | | | |
|---|---|---|---|
| Re. 21,195 | 9/1939 | Boyce | 117—161 |
| 941,605 | 11/1909 | Baekeland | 117—161 |

(References on following page)

UNITED STATES PATENTS

| | | | |
|---|---|---|---|
| 1,107,703 | 8/1914 | Redman | 117—161 |
| 1,111,286 | 9/1914 | Aylsworth | 117—161 |
| 1,137,374 | 4/1915 | Aylsworth | 117—161 |
| 1,188,014 | 6/1916 | Redman | 260—57 |
| 1,261,615 | 4/1918 | Redman | 260—57 |
| 1,788,319 | 1/1931 | Norton | 117—161 |
| 2,534,607 | 12/1950 | Laher et al. | 260—33.4 XR |
| 2,662,067 | 12/1953 | Less et al. | 260—33.4 |
| 2,668,802 | 2/1954 | Evans et al. | 260—33.4 |
| 2,808,350 | 10/1957 | Seiler | 117—161 |
| 2,875,094 | 2/1959 | Bloem et al. | 117—155 |
| 2,933,461 | 4/1960 | Mullen | 260—33.4 XR |
| 2,965,514 | 12/1960 | Less et al. | 260—31.2 XR |
| 3,039,894 | 6/1962 | Raphael et al. | 117—135.5 |

OTHER REFERENCES

Schildknecht, Polymer Processes. Interscience Publishers Inc. New York, 1961, p. 318.

MORRIS LIEBMAN, *Primary Examiner.*

L. T. JACOBS, *Assistant Examiner.*